Sept. 20, 1949.  E. SOKOLIK  2,482,221

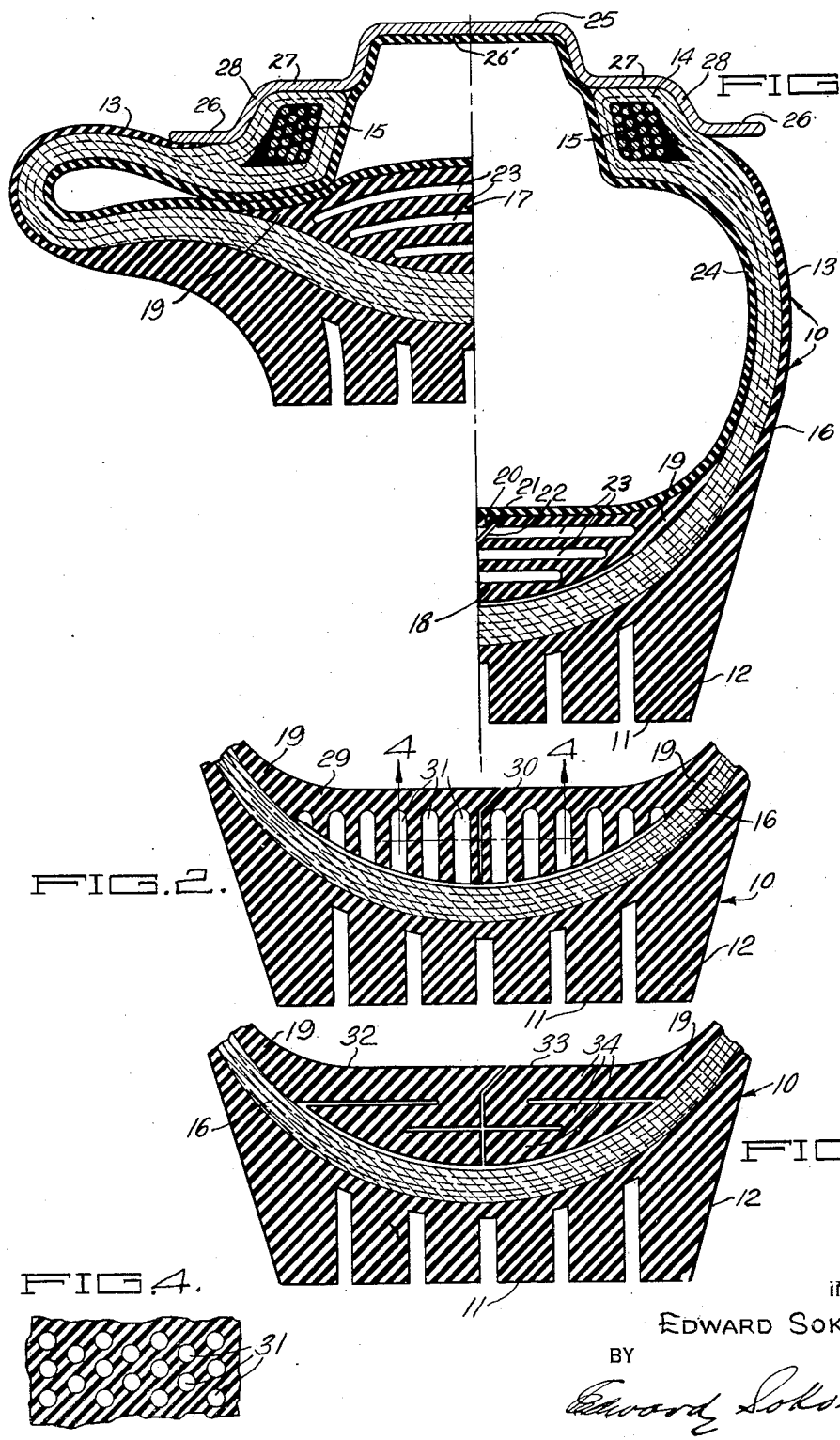

PNEUMATIC TIRE AND TIRE RIM

Filed March 16, 1946  2 Sheets-Sheet 2

INVENTOR
EDWARD SOKOLIK
BY
*Edward Sokolik*

Patented Sept. 20, 1949

2,482,221

UNITED STATES PATENT OFFICE 2,482,221

PNEUMATIC TIRE AND TIRE RIM

Edward Sokolik, New Brighton, Minn.

Application March 16, 1946, Serial No. 654,888

9 Claims. (Cl. 152—310)

1

My invention relates to improvements in pneumatic tires and rims therefor.

An important object of the invention is to provide a pneumatic tire and rim therefor, of such design that when the tire is deflated or collapsed, the rim will not tend to cut or injure the same.

A further object of the invention is to provide a pneumatic tire structure which will greatly reduce the probability of blow-outs, even when the external tread of the tire is worn thin.

A further object is to provide a pneumatic tire and rim designed to limit the extent of tire collapse, without appreciably increasing the size and weight of the tire, or the cost of the same.

A further object is to provide a tire and rim combination which will tend to prevent accidents to vehicles traveling at high speed, because of means provided to prevent separation of the collapsed tire from the rim.

A further object is to provide a pneumatic tire provided with an internal auxiliary cushion or shock absorber, integral with the tire casing, but permitting inspection of the inside of the casing.

A still further object is to provide a tire and rim therefor, of the above mentioned character, adapted for use upon conventional automotive wheels.

Other objects and advantages of the invention will be apparent during the course of the following description.

Figure 5:
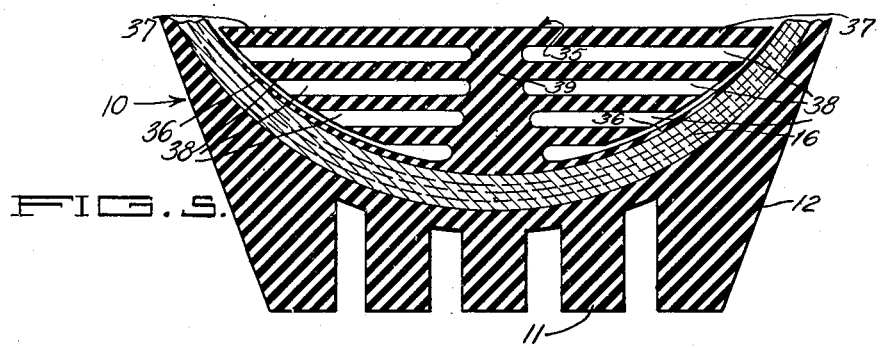
Figure 6:
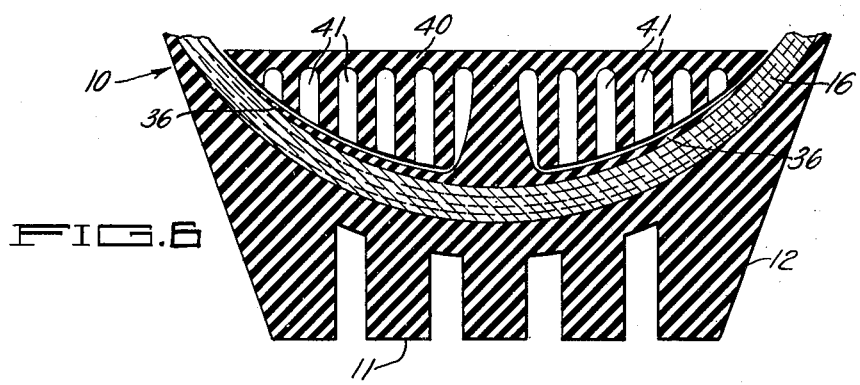
Figure 7:
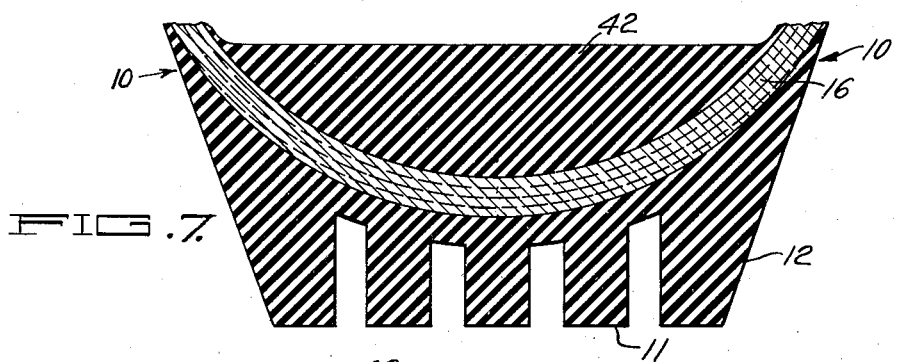

In the accompanying drawings, forming a part of this application, and in which like numerals are employed to designate like parts throughout the same, Figure 1 is a transverse cross section through a tire and rim, the tire portion on the left side of the vertical center line being shown in the collapsed position, and that portion on the right side in the inflated position, Figure 2 is a fragmentary transverse cross section through a tire casing embodying a modification of the invention, Figure 3 is a similar cross-section through a tire casing embodying a further modification of the invention, Figure 4 is a fragmentary horizontal section taken on line 4—4 of Figure 2, Figure 5 is a fragmentary transverse section through a tire casing embodying a further modification of the invention, Figure 6 is a similar section through a tire casing embodying a further modification of the invention, Figure 7 is a similar section through a tire casing embodying a further modification, and,

2

Figure 8:
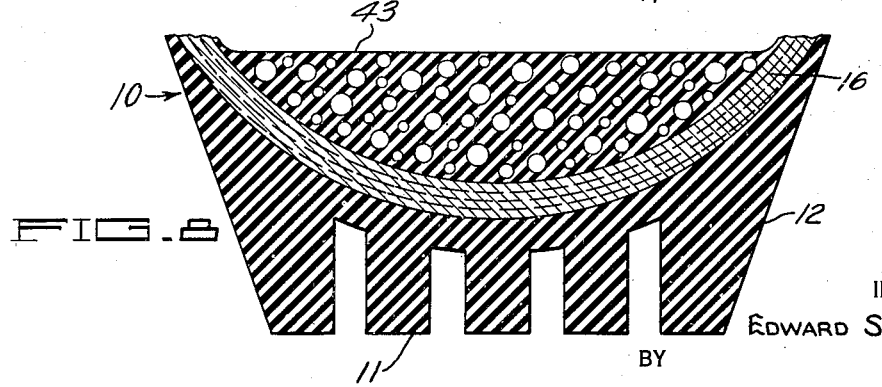

Figure 8 is a similar section through a tire casing embodying a still further modification of the invention.

In the drawings, where for the purpose of illustration, are shown preferred embodiments of my invention, attention is called first to Figure 1, wherein the numeral 10 designates a pneumatic tire casing. This casing 10 includes a rubber tread portion 11 which is preferably transversely flat for full lateral engagement upon the roadway. The flat sides 12 of the tread 11 diverge upwardly for a substantial distance and form with the flat tread an obtuse angle when the tire is inflated. The casing 10 further includes side walls 13, and the usual enlarged rim engaging beads 14. These beads 14 are provided with internal reenforcing rings 15, which are conventional, and which may comprise a plurality of annular wires embedded in rubber. The beads 14 are like those on conventional automobile tires, except that they are radially thicker for a purpose to be described. The internal wall structure 16 of the casing is conventional, comprising layers of cords embedded in rubber and forming a unitary casing wall.

The numerals 17 and 18 designate companion circumferential inner tube protectors or cushions, and these cushions extend transversely across the inside of the casing, adjacent to the tread 11. The outer circumferential edge portions 19 only of the cushions 17 and 18 are formed integral with the casing, and the entire central portions of both cushions are freely disposed upon the inner surface of the tire casing adjacent to the tread 11. The cushions 17 and 18 are disposed in opposed relation laterally, and meet substantially at the transverse center of the casing 10; and the cushion 17 carries a circumferential flange 20, which fits into a circumferential recess 21 formed by beveling the inner edge of the cushion 18, as at 22. This overlapping construction prevents the cushions 17 and 18 from pinching the inner tube at the junction of the cushions. The cushions 17 and 18 are preferably formed of rubber, and are provided with uniformly dispersed elongated horizontal recesses 23, formed in the adjacent inner circumferential edges of the cushions, and extending deep into the same, terminating near their outer surfaces adjacent to the inside surface of the casing. These recesses 23 are dispersed circumferentially about the entire cushions 17 and 18, and add to the resiliency or cushioning effect of the same. The numeral 24 designates a conventional pneumatic tire inner tube, disposed within the casing 10, and engaging upon the cushions 17 and 18.

The tire comprising the casing 10 and inner tube 24 is mounted upon a wheel rim 25, which is of conventional design except for a pair of laterally flat horizontal annular extensions or flanges 26, for a purpose to be described. The rim 25 is offset radially inwardly at its central portion, providing an annular recess 26', a pair of laterally flat horizontal annular seats 27, and substantially vertical annular shoulders 28. The beads 14 of the casing 10 engage upon the seats 27, and bear against the shoulders 28 in assembly.

In use, when the pneumatic tire is inflated, it assumes the form shown in the portion of Figure 1 to the right of the vertical center line. The cushions 17 and 18 will greatly reduce the tendency for blow-outs when the tread 11 wears thin, and at high speeds when heat is generated. The cushions will also protect the inner tube to a great extent, against punctures by nails or the like. Further, the cushions add to the overall resiliency of the tire. The air space provided by the dispersed recesses 23 in the cushions tend to keep the temperature of the inner tube low adjacent to the tread 11, and this feature tends to prevent blow-outs. The cushioning and cooling effect of the cushions 17 and 18 is increased by virtue of the fact that they are attached to the casing near their outer edges only. This also permits the inner portions of the cushions to be lifted or rolled back for inspection of the inner surface of the casing.

When the tire becomes deflated in use, the extent of collapse possible is limited by the tire and rim structure, and the rim will not tend to cut the tire casing and tube. The flat tire will not tend to leave the rim, even at high speeds, and this is an important safety feature. As shown in the lefthand portion of Figure 1, when the tire is collapsed, an upper rim bearing portion is formed by the annular flanges 28, and lateral seats 27, to engage against and support the adjacent substantially horizontal portions of the side walls 13 and beads 14 respectively. In opposed relation to this upper running bearing, a lower substantially horizontal running bearing is formed by the lower thickened portions of the side walls 14, tread 11, and cushions 17 and 18. The combined thicknesses of these described upper and lower running bearings prevents total collapse of the tire, and the rim will not cut the tire. In the collapsed condition, the inner or central portions of the cushions 17 and 18 are forced upwardly into the annular recess 26' and function as guides to prevent the casing 10 from moving laterally of the wheel rim.

It is thus seen that this tire and rim construction possesses marked advantages relative to safety, durability, and tire life.

In Figure 2, I have shown a modified form of the invention, wherein all parts and their functions are identical with those shown and described in connection with the first form of the invention, except the opposed annular cushions. In Figure 2, the numerals 29 and 30 designate cushions similar to the cushions 17 and 18, except that the circumferentially dispersed recesses 31 are arranged radially, and are formed in the outer surfaces of the cushions. These recesses 31 terminate near the inner circumferential surfaces of the cushions 29 and 30. The cushions 29 and 30 are integral with the tire casing at their side edges only, in the same manner as the cushions 17 and 18.

In Figure 3, there is shown a further modification of the invention, wherein cushions 32 and 33 are provided, and these cushions comprise layers of rubber 34 folded upon themselves and extending circumferentially about the tire casing. The cushions 32 and 33 are integral with the casing at their sides only in the same manner shown and described in the first form of the invention. The modification shown in Figure 3 is otherwise identical with that shown and described in connection with the first form of the invention.

In Figure 5 a further modification of the invention is shown wherein a single annular cushion 35 is provided instead of the opposed annular cushions shown in the previous forms of the invention. The cushion 35 has annular lateral flaps 36 integral with the casing and the cushion is formed to provide opposed side portions 37 connected with the flaps 36 at their center portions only, see Figure 5. The outer annular surfaces of the portions 37 are provided with horizontally dispersed recesses 38, about their entire circumference. These recesses terminate near the center of the cushion where a solid annular portion 39 is formed. All other parts of the invention set forth in Figure 5 are identical with those shown and described in the first form of the invention.

In Figure 6 a further modification of the invention is shown, wherein the numeral 40 designates a single annular cushion identical with the cushion 35, except that vertically arranged recesses 41 are provided. These recesses 41 are formed in the outer annular surfaces of the opposed three side portions of the cushion 40, and terminate near the top surface of the same. All other parts in this modification are identical with those shown and described in connection with the first form of the invention.

In Figure 7 a further modification is shown, wherein the numeral 42 designates a solid rubber cushion integral with the tire casing across its outer lateral surface, and throughout the entire circumference of the same. All other parts shown in this form of the invention are identical with those shown and described in the first form thereof.

Figure 8 shows a still further modification, wherein the numeral 43 designates an annular cushion formed of porous rubber and integral with the tire casing for its full width upon its outer surface. All other parts in this form of the invention are identical and have the same functions as those shown and described in connection with the first form thereof.

It is to be understood that the forms of my invention herewith shown and described are to be taken as preferred examples of the same and that various changes in the shapes, size, and arrangement of parts may be resorted to, without departing from the spirit of my invention, or the scope of the subjoined claims.

Having thus described my invention, what I claim is:

1. A combined pneumatic tire and tire rim, comprising a rim, such rim including lateral seats and side extensions, a tire casing mounted upon the rim and having beads to engage upon the lateral seats, side walls, and a tread portion, a resilient cushion disposed within the casing adjacent to the tread portion and permanently attached to the tire casing and forming a radially inner substantially continuous circumferential surface, and an inner tube arranged within the casing and engaging upon the substantially continuous circumferential surface, the arrangement being such that when the tire is deflated the lateral seats, side extensions, beads and side walls coact to form a radially inner circumferential running bearing to engage upon the tread portion, side walls, and resilient cushion coacting to form an outer circumferential running bearing.

2. A combined pneumatic tire and tire rim, comprising a rim, such rim including lateral seats and side extensions, a tire casing mounted upon the rim and having beads to engage upon the lateral seats, side walls, and a tread portion, opposed annular foraminous cushions mounted within the casing adjacent to the tread portion and having parts permanently attached to the casing near the junctions of the tread portion and side walls and forming a radially inner substantially continuous circumferential surface, and an inner tube arranged within the casing and engaging upon said substantially continuous circumferential surface, the arrangement being such that when the tire is deflated the lateral seats, side extensions, beads and side walls coact to form a radially inner circumferential running bearing to engage upon the tread portion, side walls, and cushions coacting to form an outer circumferential running bearing.

3. A combined pneumatic tire and tire rim, comprising a rim, such rim including opposed lateral seats and opposed substantially horizontal side extensions, a tire casing mounted upon the rim and having beads to engage upon the lateral seats, side walls, and a tread portion, opposed annular cushions mounted within the casing adjacent to the tread portion and connected with the casing near their outer lateral edges only, such cushions being provided with substantially lateral recesses throughout their entire circumference and providing freely disposed cushion sections adapted to be lifted, and an inner tube arranged within the casing and engaging upon the resilient cushions, the arrangement being such that when the tire is deflated the lateral seats, side extensions, beads and side walls coact with the tread portion and resilient cushions to limit the extent of tire collapse.

4. In a pneumatic tire casing, a tread portion, sidewalls, and opposed annular resilient cushions mounted within the casing adjacent to the tread portion and permanently attached to the casing near their outer lateral edges only.

5. In a pneumatic tire casing, a tread portion, side walls, and opposed annular resilient cushions mounted within the casing adjacent to the tread portion and permanently attached to the casing near the outer lateral edges of the cushions only, the inner portions of the cushions being freely disposed upon the inner surface of the casing.

6. In a pneumatic tire casing, a tread portion, side walls, and opposed resilient cushion sections disposed within the casing adjacent to the tread portion and having parts integral with the casing and forming a substantially continuous radially inner circumferential surface, the cushion sections being freely disposed and adapted to be lifted.

7. In a pneumatic tire casing, a tread portion, side walls, and a resilient cushion mounted within the casing adjacent to the tread portion, said cushion including lateral flaps permanently attached to the casing and circumferentially extending cushion sections connected with the flaps near the center of the tread portion only.

8. In a pneumatic tire casing, a tread portion, side walls, and a resilient cushion mounted within the casing adjacent to the tread portion, said cushion including lateral flaps permanently attached to the casing and circumferentially extending cushion sections connected with the flaps near the center of the tread portion only, said opposed cushion sections having substantially lateral recesses formed therein.

9. In a pneumatic tire casing, a tread portion, side walls, and opposed annular resilient cushions mounted within the casing adjacent to the tread portion and permanently attached to the casing near their outer lateral edges only, said cushions having substantially lateral recesses formed therein throughout their entire circumference and forming a substantially continuous radially inner circumferential surface.

EDWARD SOKOLIK.

REFERENCES CITED

The following references are of record in the file of this patent:

UNITED STATES PATENTS

| Number | Name | Date |
|---|---|---|
| 685,002 | McGiehan | Oct. 22, 1901 |
| 854,063 | Thomson | May 21, 1907 |
| 888,345 | Musclow | May 19, 1908 |
| 1,041,739 | Chipley | Oct. 22, 1912 |
| 1,318,711 | Williams | Oct. 14, 1919 |
| 2,039,727 | Ledwinka | May 5, 1936 |
| 2,074,284 | Stevenson | Mar. 16, 1937 |
| 2,102,406 | Cohen | Dec. 14, 1937 |
| 2,166,927 | Brunswick | July 25, 1939 |

FOREIGN PATENTS

| Number | Country | Date |
|---|---|---|
| 272,282 | Great Britain | 1927 |
| 628,732 | France | 1927 |
| 629,990 | France | 1927 |
| 766,232 | France | 1934 |